F. H. G. BRANDT & J. R. EVANS.
BALING PRESS.
APPLICATION FILED JUNE 24, 1914.

1,239,871.

Patented Sept. 11, 1917.
9 SHEETS—SHEET 9.

Witnesses
Frank R. Glore
G. W. Duvall

Inventors:
F. H. G. Brandt and J. R. Evans
By George Y. Thorpe
Atty.

UNITED STATES PATENT OFFICE.

FOKKO H. G. BRANDT AND JOHN R. EVANS, OF KANSAS CITY, KANSAS, ASSIGNORS TO EVANS-BRANDT MANUFACTURING COMPANY, OF KANSAS CITY, KANSAS, A CORPORATION OF KANSAS.

BALING-PRESS.

1,239,871.      Specification of Letters Patent.      Patented Sept. 11, 1917.

Application filed June 24, 1914. Serial No. 846,979.

*To all whom it may concern:*

Be it known that we, FOKKO H. G. BRANDT, a citizen of Germany, and JOHN R. EVANS, a citizen of the United States, residing at Kansas City, in the county of Wyandotte and State of Kansas, have invented certain new and useful Improvements in Baling-Presses, of which the following is a specification.

This invention relates to baling presses and more especially to automatic wiring and knotting mechanism therefor, and has for its object to produce a baling press provided with mechanism of the character mentioned which will expeditiously and effectively wire the bales and tie the ends of the wires around the bales securely together.

With this general object in view, the invention consists in certain novel and peculiar features of construction and organization as hereinafter described and claimed; and in order that it may be fully understood, reference is to be had to the accompanying drawings, in which:—

In the said drawings, where like reference characters identify corresponding parts in all the figures, 1 indicates a baling case of the customary rectangular form in cross section; 2 is the hopper upon and communicating with the interior of the case to supply the baling material thereto and 3 the reciprocatory head block or plunger for compressing the baling material into bales, any suitable mechanism not shown being employed to operate the head block.

Figures 1, 2, 7, 8:
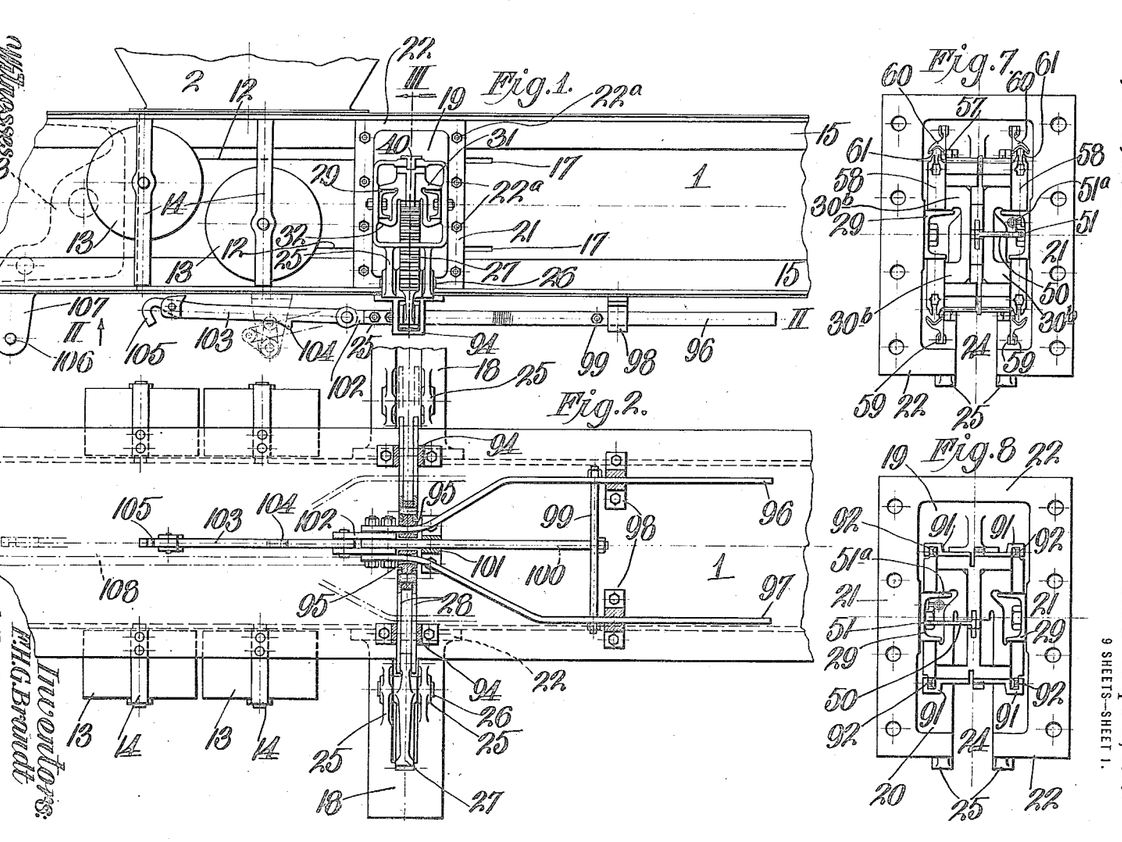
Figure 1, is a side elevation of a part of a baling press embodying our invention.
Fig. 2, is a horizontal section of the same taken on the line II—II of Fig. 1.
Fig. 7, is an inner end view of the looping and cutting mechanism box.
Fig. 8, is a similar view of the needle mechanism box.
Figure 9:
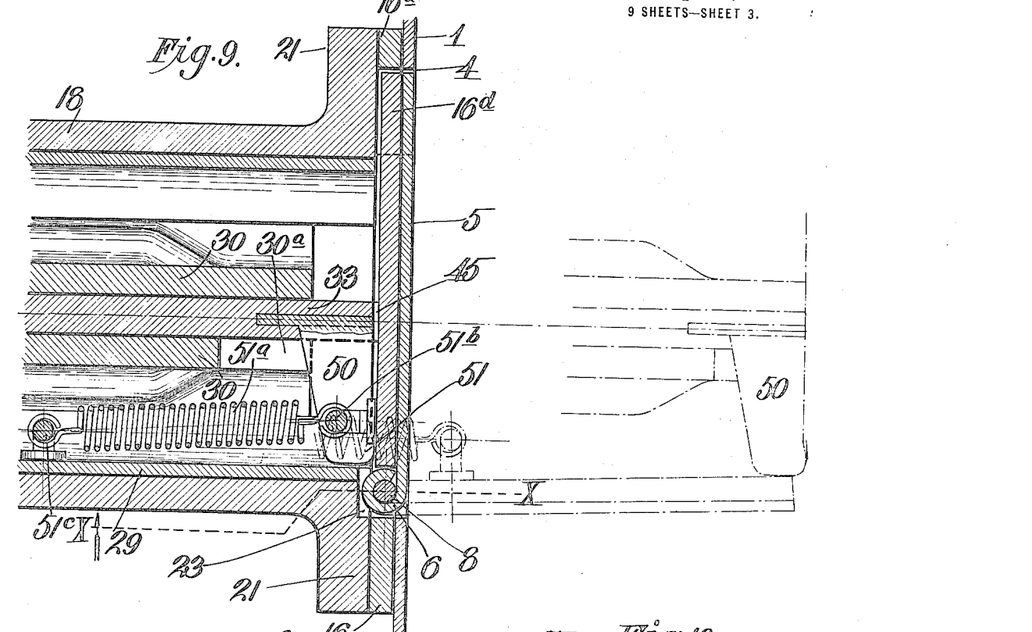
Fig. 9, is a horizontal section taken on the line IX—IX of Fig. 10.

At opposite sides and just rearward of the hopper with respect to the head block the baling case is provided with a pair of pivotally disposed door-openings 4 normally closed by doors 5 which, as shown in Fig. 9, constitute parts of the side walls of the baling case. Each door is provided at what may be termed its front corners with outturned hinge loops 6 and centrally between said hinge loops with a similar loop 6 and said loops each fit between and stand in vertical alinement with a pair of out-turned hinge loops 7 formed integrally with the side walls of the baling case, and connecting each hinge loop with the adjacent pair of wall loops is a hinge pin 8. Between the adjacent ends of said hinge pins 8, longitudinally perforated wire-guide blocks 9 are secured to the side walls of the case, said blocks having ribs 10 which enter openings 11 in the doors when the latter are closed, the said openings being necessary to accommodate the ribs 10 which are provided in order that the perforations shall be disposed close to the outer sides of the baling case wall so that the wires 12 may extend close to the walls. The wires lead from spools 13, mounted in U-shaped brackets 14, secured to the sides of the baling case, as shown most clearly in Figs. 1 and 2.

Figure 12:
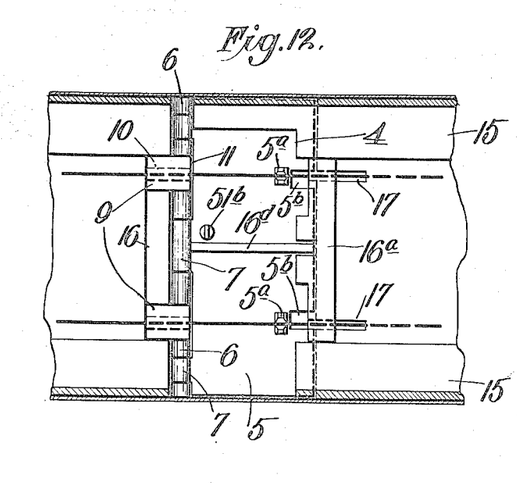
Fig. 12, is a section taken on the line XII—XII of Fig. 10.

The baling case is preferably provided as usual with corner angle irons 15 which fit against the outer sides of the side walls of the baling case, and of the same thickness as the vertical flanges of said angle irons are filler blocks 16 and 16ª which are secured to the outer sides of the baling case along the vertical margins of the door openings 4. The filler blocks 16 fit between the wire-guide blocks 9 and the other filler blocks 16ª extend from the lower edge of the vertical flanges of the upper angle irons to the upper edges of the vertical flanges of the lower angle irons, as shown most clearly in Fig. 12, and the last named filler blocks, are provided in their inner sides with longitudinal grooves 16ᵇ and central notches 16ᶜ, the notches being provided for the reception and accommodation of transverse stiffening ribs 16ᵈ, secured to the outer sides of the doors. The grooves 16ᵇ are for the accommodation of the wires 12, as hereinafter explained, and communicate with longitudinal slots 17 in the side walls of the baling case, the wires being adapted to extend from points behind the doors diagonally inward through grooves 16ᵇ and slots 17 into the case, so as to guard against any abrupt bending of the wire when engaged and drawn from the spools by the bale in process of formation, as hereinafter more particularly referred to, as such bending of the wire would increase the chances of breakage by producing unnecessary friction between the wires and the baling case.

Referring now to the mechanism for disposing the wire around the bale and then cutting and tying the ends of the wire, 18 are similar boxes open at both ends and arranged in alinement transversely and at opposite sides of the baling case and in communication with the door openings thereof. The boxes at their inner ends are off-set above and below to produce enlargements or extensions 19 and 20 respectively and at their inner ends are provided side flanges 21 and short top and bottom flanges 22, the boxes being secured rigidly to the opposite walls of the baling case by bolts 22ª.

Figure 10:
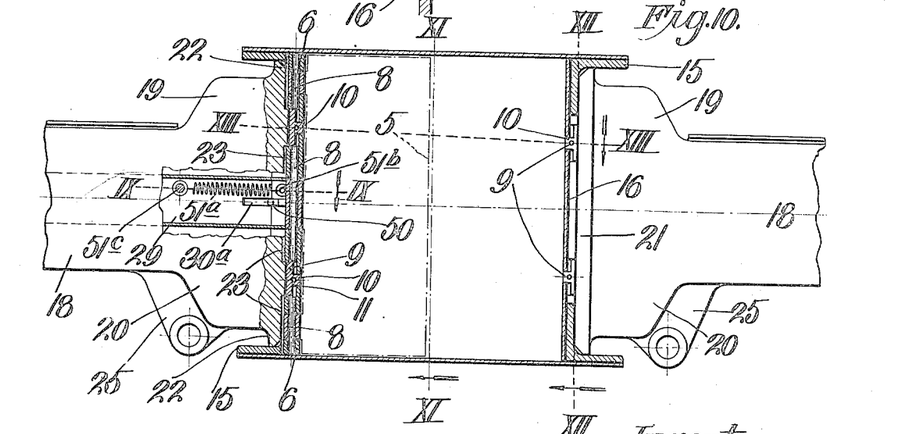
Fig. 10, is a vertical section taken on the line X—X of Fig. 9.
Figures 11, 27:
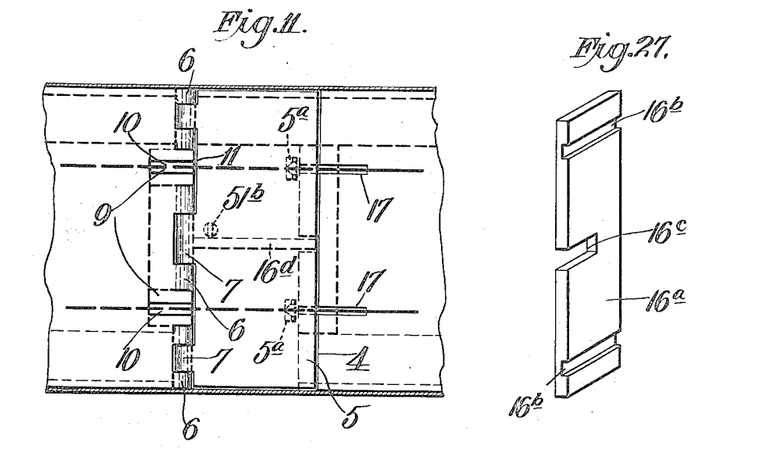
Fig. 11, is a section taken on the line XI—XI of Fig. 10.
Fig. 27, is a detailed perspective view of one of a pair of filler blocks forming a part of the machine.

At the inner edges of filler blocks 16 the inner ends of the boxes 18 are recessed at 23 for the accommodation of the out-turned hinge loops of the door and walls, as shown clearly in Figs. 9 and 10. The lower walls of the boxes from their inner ends outward for the greater part of their length are provided with wide central slots or openings 24 flanked by depending bearing lugs 25 forming journal bearings for trunnions 26 of cog segments 27, links 28 being pivotally connected to the lower ends of the cog segments for the purpose of imparting oscillatory movement thereto through mechanism hereinafter described, the inward movement of the cog segments being adapted to carry them partly through the door openings 4 while the doors are open.

Arranged within the boxes 18 and secured to the side walls thereof are oppositely located channel tracks 29 and mounted slidingly upon said channel tracks are channeled rack bars 30, the upper arms 31 resting upon the channeled tracks and bearing against the side walls of the box and the lower arms 32 engaging the tracks at their undersides and also bearing against the side walls of the boxes.

A third rack bar 33, T-shaped in cross section, is arranged with its head or flanges resting upon the rack bars 30 of each box, and its stem fitting snugly between said rack bars. The teeth of all three rack bars of each box are located at the lower edges of such bars and occupy the same horizontal plane but the teeth 34 of rack bar 33 do not extend to the outer end of the bar, as do the teeth on rack bars 30, as will be readily seen by reference to Figs. 3 and 5.

The T-shaped rack bars are provided with recesses 35 at their outer ends and upper sides and secured in said means are brackets 36 carrying pivoted dogs 37 and springs 38 tending to press said dogs upwardly, and said dogs are adapted to reciprocate in slots 39, formed in the top walls of the boxes 18, said slots being covered by plates 40 which are reduced in thickness at their inner ends to provide upward extensions or inverted pockets for the slots 39, the arrangement being such that when the dogs travel inward their full distance, the springs 38 force them upwardly into the pockets 41 and thereby not only positively limit inward movement of the central rack bars 33 but also guard against reverse or outward movement of said rack bars until a direct application of force is imposed upon them to move them outward.

The central rack bars are provided with longitudinal slots 42 and 42ª at their outer ends, the slot 42 which is in the rack bar of the looping and cutting mechanism carrying box being shorter than the slot 42ª which is in the corresponding rack bar of the needle carrying box, for a purpose which hereinafter appears, and in both cases cross pins 43 extend from the adjacent or flanking rack bars 30 through said slots, as shown clearly in Figs. 3, 4, and 5. It will thus be seen that when the gear segments 27, which engage the teeth of the inner or central rack bars, as well as the flanking rack bars, swing inward, all three rack bars are moved inwardly together and that as the dogs 37 reach the inner ends of the slots 39 and thereby arrest the central rack bars, the gear segments have passed out of engagement with the teeth of said central rack bars without interrupting the inward travel of the said flanking rack bars, it being noted however that such movement terminates as the pins 43 travel from the outer to the inner ends of slots 42 and 42ª respectively, this excess travel of the flanking rack bars being provided to effect the looping of the ends of the wires and the cutting of the wires before the knots are formed and the extra travel of the needles after the inward travel of the corresponding central rack bar has ended.

Figures 3, 4, 5, 6:
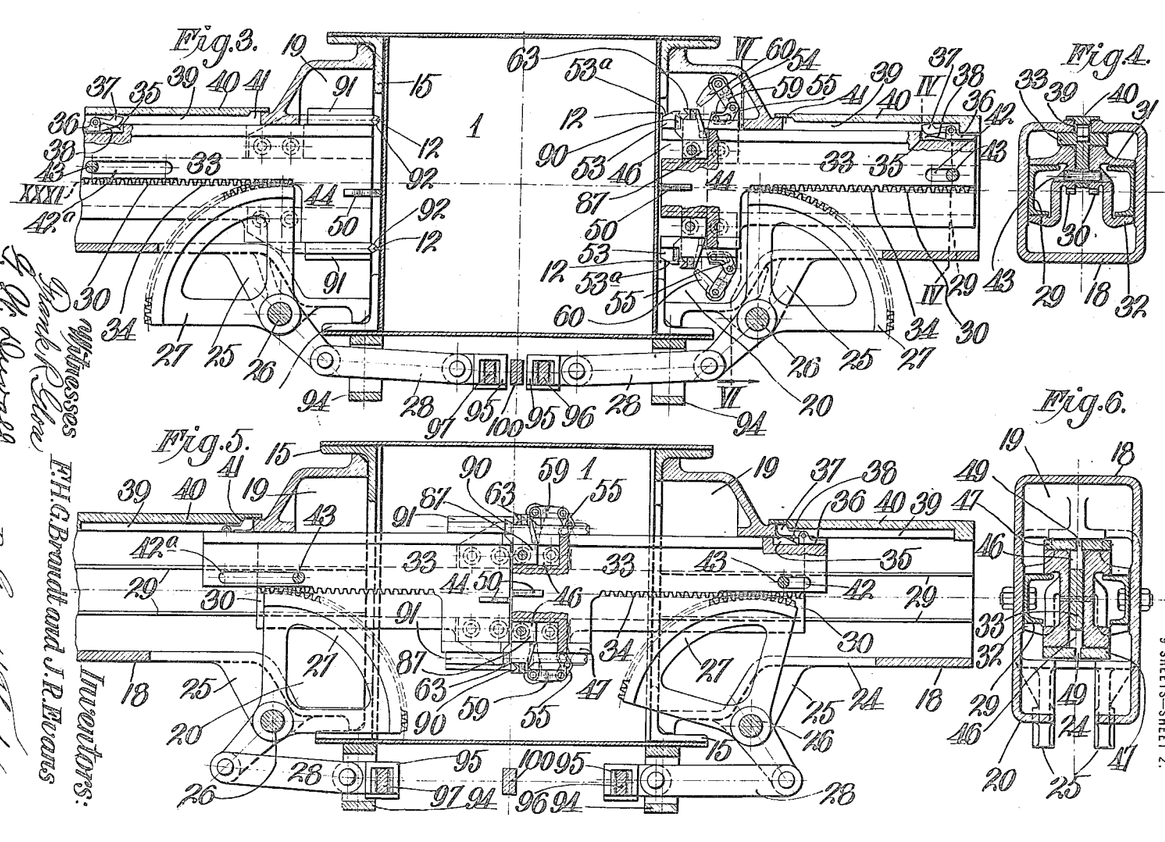
Fig. 3, is a vertical transverse section taken substantially on the dotted line III of Fig. 1.
Fig. 4, is a vertical section taken on the line IV—IV of Fig. 3.
Fig. 5, is a section taken at about the same point as the section shown by Fig. 3, but with certain operative parts in a different position of adjustment.
Fig. 6, is a vertical section taken on the line VI—VI of Fig. 3, with certain parts omitted.

It will also be apparent that when the operation of the gear segments is reversed, the central rack bars are held inoperative by the dogs engaging the outer walls of the pockets 41 until the pins 43 reach the outer ends of the slots in the central rack bars, upon which said pins apply positive pressure and thereby overcome the resistance of springs 38 and effect the tripping of the dogs and the outward movement of the central rack bars until all of the rack bars have attained their initial positions, as shown in Fig. 3.

The central or T-shaped rack bars are provided at their inner ends with vertical depending arms 44 having transverse notches 45 in their inner edges for the accommodation of the ribs 16ᵈ at the outer sides of doors 5, and the depending arm 44 of the rack bar 33 of the looping and cutting mechanism box 18 is also provided with a pair of notches 46 above and below notches 45, for a purpose which hereinafter appears. The rack bar 33 last referred to is also provided at its inner end with laterally projecting flanges 47 in planes above and below the notches 46, and in the upper and lower sides of the upper flanges 47 and lower flanges 47 respectively are formed recesses 48, and in both flanges longitudinal slots 49 are provided, the same registering with the notches 46. Projecting laterally from the inner portion of each depending arm 44, is a door opening arm 50 having its outer end rounded at 51 for direct engagement with the proper door so that as the rack bars begin to move inward under the power of the gear segments as hereinbefore explained, the rounded ends of the arms 50 apply pressure upon the ribs 16ᵈ of the doors close to the hinges thereof and thereby effect a quick action of the doors, as indicated by dotted lines in Fig. 9, it being also noticed from said figure, that the outer ends of the arms 50 maintain the doors in open position until the reverse movement of the rack bars takes place, upon which the retractile springs 51ª, tensioned by the opening of the doors, retract and effect the closure of the doors, the said springs being connected to the doors as at 51ᵇ and to the adjacent channel tracks 29, as at 51ᶜ. (See Figs. 9 and 10). In this connection it will be noticed by reference to the same figures, that one of each set of rack bars 30 is provided with a slot 30ª for the accommodation of the corresponding door opening arm 50 in the excess inward movement of the rack bars 30 over that of the rack bars 33.

Figures 23, 24, 25, 26:
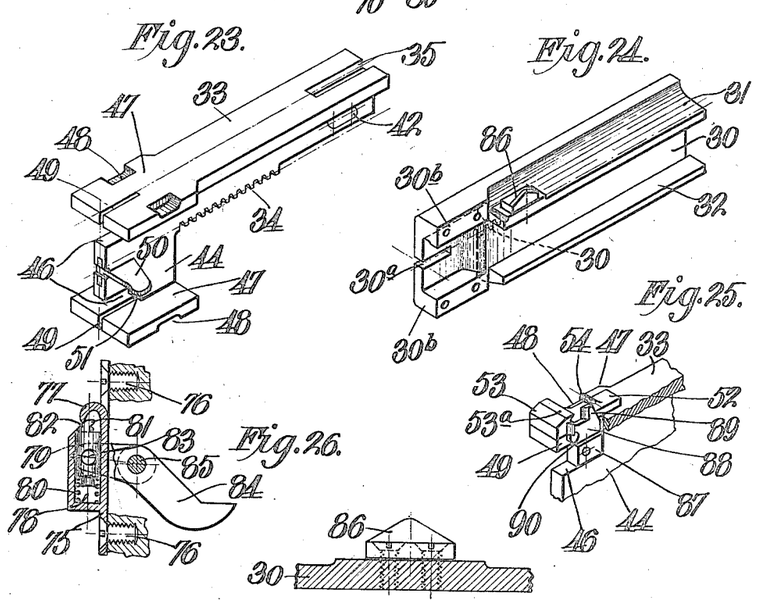
Fig. 23, is a detailed perspective view of the cutter carrying rack bar.
Fig. 24, is a detailed perspective view of one of the looping mechanism carrying rack bars.
Fig. 25, is a sectional perspective view showing the rack bar shown by Fig. 23, a part of the looping mechanism and the cutting mechanism.
Fig. 26, is a fragmentary vertical section of one of the devices for holding one of each pair of wires firmly at a particular point, preliminary to the looping of the wire adjacent to such point and of a device for tripping such holding device.
Figure 28:
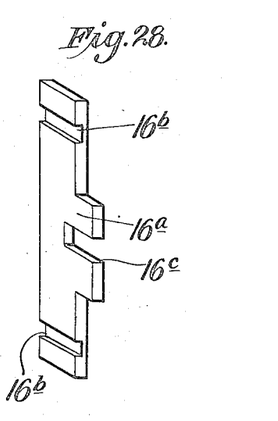
Fig. 28, is detailed perspective view of a filler block between the baling case and the looping mechanism box.
Figure 29:
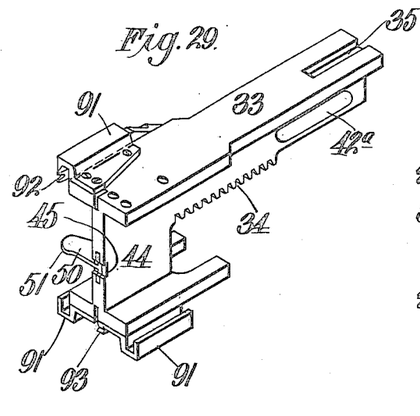
Fig. 29, is a detailed perspective view of the central rack bar of the needle box, one set of the needles associated therewith and one of the guides for said set of needles being omitted.
Figure 30:
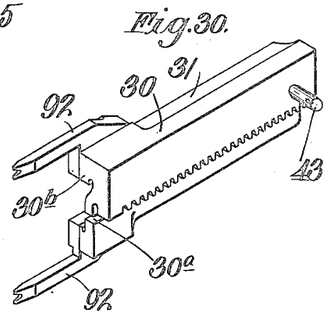
Fig. 30, is a detailed perspective view of the needles shown in Fig. 29, together with the flanking rack bar carrying said needles.
Figure 31:
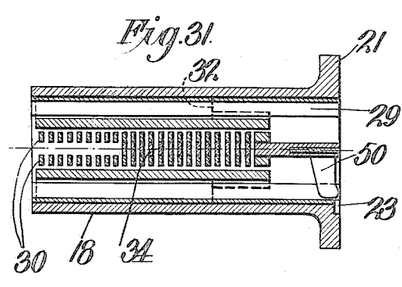
Figs. 31 and 32, are horizontal sections in the plane of the dotted line XXXI of Fig. 3, Fig. 31 being a section through the needle mechanism box and Fig. 32 a section through the wire looping and cutting mechanism box.
Figure 32:
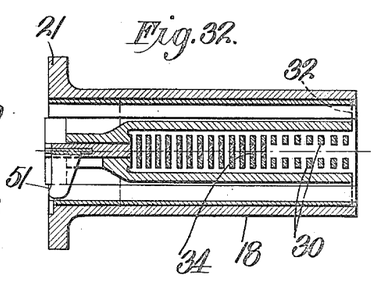

Secured rigidly to the upper and lower sides of the widened or flanked portions of rack bar 33 of the box containing the looping and cutting mechanisms are plates 52 terminating at their inner ends in upturned outwardly facing hooks 53, and provided outward of said hooks with laterally projecting pivot pins 54. (See Figs. 20 and 25.)

55 are angle arms provided with longitudinal slots engaging pins 54 and adapted for movement in a vertical plane in the adjacent recesses 48, (see Figs. 20 and 23) and the slots of said arms are slightly widened or off-set at one end as at 55ª for a purpose which hereinafter appears, and adjacent to said widened or off-set ends of the slots the arms are secured rigidly to horizontal shafts 56 journaled in lugs 57 projecting from blocks 58, secured to opposite sides of the inner ends of the rack bars 30. It will be noticed by reference particularly to Figs. 20 and 24, that the said rack bars 30 are provided with extensions at their inner ends, the extensions comprising upright portions 30ª and outwardly projecting flanges 30ᵇ, at the upper and lower margins of portions 30ª, and that to the upper flanges 30ᵇ upwardly projecting blocks 58 are bolted, it being understood that similar inverted blocks are bolted to the lower flanges 30ᵇ, as will be understood by reference to Figs. 3, 5 and 6.

Figures 20, 21:
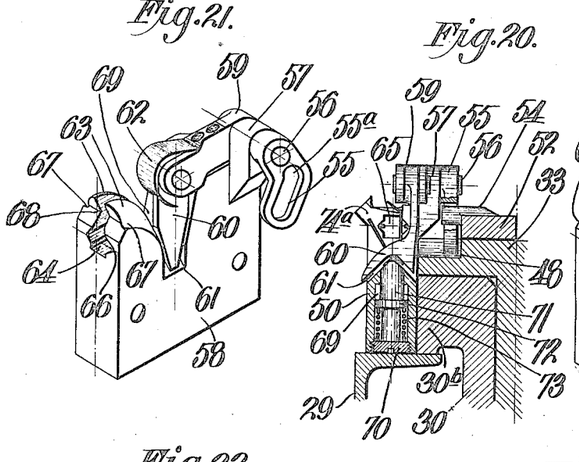
Fig. 20, is a vertical section on the dotted line XX of Fig. 16.
Fig. 21, is a detailed perspective view of part of the wire looping mechanism.

59 are arms secured rigidly to the outer ends of shafts 56 vertically over the upper blocks 58 and under the lower or inverted blocks 58, and said arms project toward the baling case and pivotally carry wire-bending forks 60 for entering the flaring pockets 61 of blocks 58. To hold the wire bending forks 60 in position to properly enter the pockets at all times, springs 62 are secured to arms 59 and to said forks. In Fig. 3, the forks 60 are shown as in their normal or elevated position as distinguished from their depressed or operative position, as shown by Figs. 5, 20 and 21.

Inward of the pockets 61, the blocks 58 are provided with upstanding rounded parallel horns 63 spaced apart a suitable distance to permit wires to pass between them, and such spaces open into channels 64 which are alined with similar channels 65 in the portions of the blocks outward of the pockets 61, and said channels 64 and 65 are widened by the provision of V-shaped grooves 66 for a purpose which hereinafter appears, and in this connection it will be noticed by reference to Fig. 20 that the shanks of the forks 60 are at one side of the alined channels 64 and 65 to avoid interfering with the needle operations, hereinafter referred to, and the horns 63 are slightly narrower than the blocks to provide recesses 67, and in their inner faces they are provided with transverse grooves 68 for the holding of the wires while the same are being bent preliminary to the cutting, looping and knotting operations. The tensioning of or pull on the wires by the bale being formed, when the wires are loosely interlocked or knotted to complete the knot, first effects the withdrawal of said knotted ends from pockets 61, but as a precautionary measure, provision is made for the expulsion of the wires from said pockets, as follows: The blocks 58 are provided with vertical chambers 69 which open through the V-shaped bottoms of the pockets 61 (see Figs. 20 and 22) and are closed at their opposite ends by removable caps 70, and fitting slidingly in said chambers are pins 71 provided with collars 72, and encircling springs 73 between the caps and collars, which springs normally hold the pins projected into the pockets. When the forks 60 bend the wires into the pockets 61, the pins will be repressed and the springs 73 compressed in order that they may, at the proper time, reproject the pins with sufficient force to expel the wires out of the channels 65 and through the space between the looping horns 63. The portions of blocks 58 outward of the pockets are provided with sloping grooves 74, one of said grooves accommodating the free ends of the wires 12 leading from the spools at the same side of the machine as the wire looping and cutting mechanism box, the groove of the other block 58 accommodating the free ends of the wires leading from the corresponding side of the bale being formed, the wires leading from the bale being numbered 12ª for convenience of reference. It is well to state in this connection that there are required at least four spools of wire, two at each side of the baling case, and that the first knot between the two upper wires and the first knot between the two lower wires is tied by hand as indicated by Fig. 14, and that the wires at the opposite sides of the case extend substantially parallel except when sufficient material has been compressed to form a bale of the desired size, and certain operations are then performed either through manual control or automatically to effect inward travel of the various rack bars and the parts carried thereby. When the wires are extending substantially parallel they are disposed as shown most clearly in Fig. 13, that is to say, they extend through the wire guide blocks 9, along the outer surfaces of the doors through the forked guides 5ª and then to the material being baled, one pair of the wires however, viz., those at the looping and cutting mechanism box side of the press, extending through guides located adjacent the free edge of the corresponding door 5, and said door is provided with openings 5ᵇ to accommodate said guides. The guides are each constructed as follows:

75 is a plate secured by screw bolts 76 to the inner end of the adjacent box 18 and formed with a hook 77 and a pocket 78, and fitting slidingly in the pocket is a pin 79 held normally by spring 80 against the terminal of hook 77 and projecting slightly out of the pocket. The projecting portion of the pin forms a hook 81 and said hook is beveled at 82 in such a way that a wire under tension between the bale and a spool will, as the door is closed, press sidewise against the beveled surface 82 and effect the repression of the pin into the pocket 78 and pass into the hook 77 and drop back over the hooks 81 so that when the bale is completed and the looping and cutting mechanism moves inward the wire will bend within the said guide around hook 81 in the manner indicated diagrammatically by Fig. 14, this being more clearly understood by reference to Fig. 13, where it is shown as extending through one of said guides.

The pins 79 are provided with laterally projecting arms 83 which project through the side walls of pockets 78 and are pivotally engaged by levers 84 pivoted at 85 to the adjacent box 18 (see Fig. 13) and in the path of movement of tripping cams 86 secured to rack bars 30. By reference particularly to Fig. 26 it will be seen that as one of the cams operates its associated lever 84, the corresponding pin 79 is withdrawn into the pocket 78 and thus permits the wire under tension to spring inwardly, this action being positive because the adjacent ends of the pockets afford resistances which will guard against the wires being drawn into the pockets by the withdrawing pins, as will be readily understood by reference to Fig. 26.

To dispose the proper wires in the grooves 74 of blocks 58, the outer walls 74ª of said grooves are beveled at both their inner and the outer sides, being beveled at their outer sides to facilitate the slipping of the tensioned wire from a position approximating the dotted line "a" in Fig. 14 to the adjacent full line position of said wire. The bevel on the inner side of said wall is to facilitate the slippage of the wire over said wall after the wire is tied at the rear end of the bale and the latter is ready for discharge from the baling case.

Figure 15:
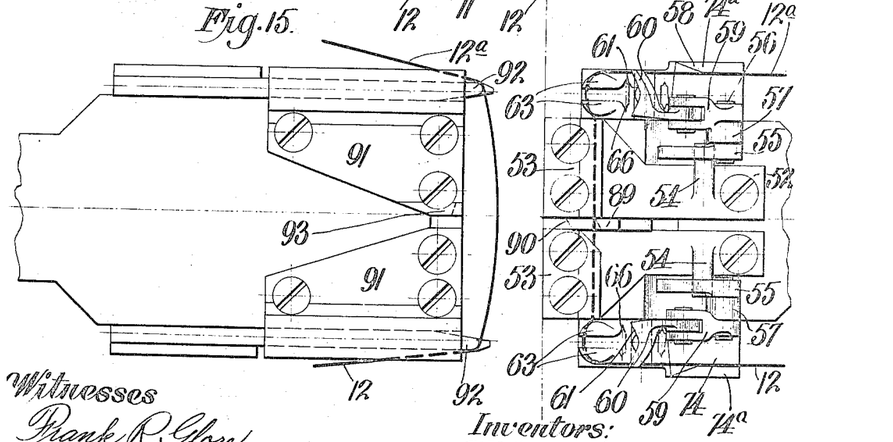
Fig. 15, is a plan view showing the wire engaging parts in what may be termed their next or second position, that is, with the parts positioned to stand to form loops in one of the wires.

As the rack bars travel inward, the wires 12 extending from the spools at the right hand side of the press through the guides adjacent the free edge of the contiguous door, respectively slip over and under the beveled edges 53ª of the hooks 53 and snap behind said hooks and are received by the transverse grooves 68 of the horns 63, which horns in their continued inward movement press the intermediate portions of the wires against the hooks 53 and begin to bend said wires at the ends of the intermediate portions, as indicated by dotted lines in the right hand half of Fig. 15, and as these bending actions begin the wires are cut or severed between the hooks 53. To perform this cutting operation and to subsequently cut the wires from the spools at the needle box side of the press, blocks 87 fit in notches 46 of the central rack bar 33 and are secured rigidly to and between the flanking rack bars 30 and said blocks are provided with blades 88 slidingly engaging slots 49 of said central rack bar. Each blade is provided with a pair of cutting edges 89 and 90, the former being adapted to sever the wires against the hooks 53 as hereinbefore stated, while the cutting edges 90 are adapted to sever the wires leading from the slots at the opposite side of the press, it being noted by reference to Figs. 3 and 5, that the cutting edges 90 occupy horizontal planes between the planes of the cutting edges 89 so that the cutting edges 90 cannot come into engagement with the wires adapted to be severed by the cutting edges 89.

Figure 16:
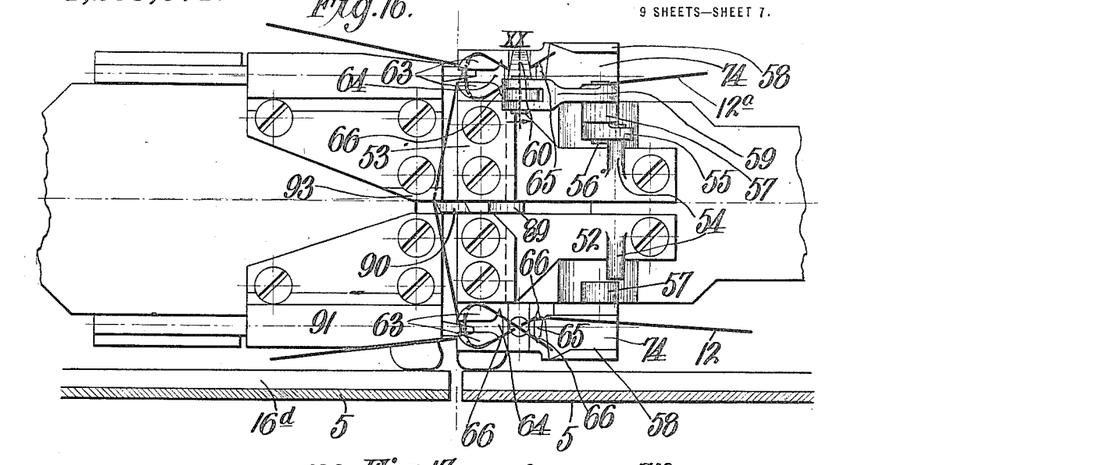
Fig. 16, is a plan view showing the parts in what may be termed their third position, that is, with the loops in one of the wires completed and the needles about to force the other wire through said loops.
Figure 22:
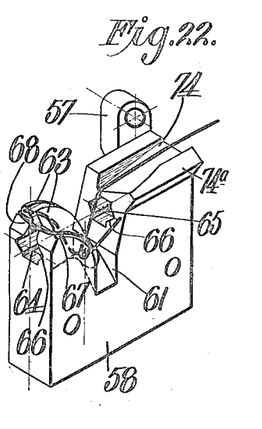
Fig. 22, is a detailed perspective view of one of the blocks of the wire looping mechanism of which there are a pair, the other one being shown in Figs. 20 and 21.

Immediately after the wires are cut by the cutting edges 89, the cut ends under the inward movement of horns 63 spring across the wires where they bridge the pockets 61, to approximately the position shown in Fig. 16, and as this action occurs the pins 54, through engagement by the outer ends of the slots of angle arms 55, swing said angle arms and cause their forks 60 to engage said ends of the wire and also the adjacent portion thereof and bend the same in the pockets 61, as indicated by Figs. 20 and 22, in which position the forks continue to hold the wires until the needles perform their threading function as hereinafter explained.

Figure 13:
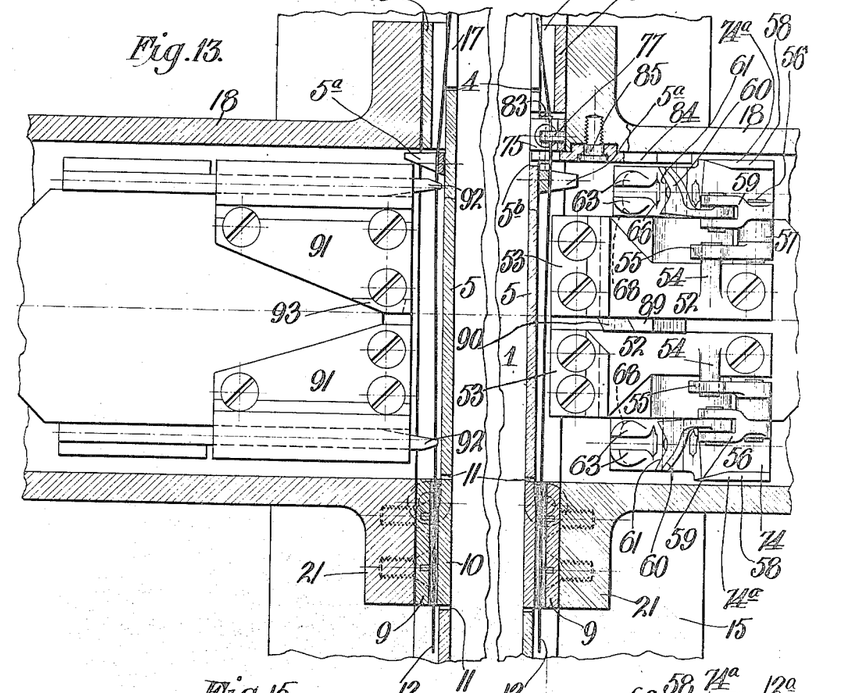
Fig. 13, is a horizontal section chiefly in the plane of the upper set of the wire-guiding mechanisms, and also shows the baling case broken to give more room for the illustration of the wire engaging parts, the wires being shown in said figure in their initial or normal positions.
Figure 14:
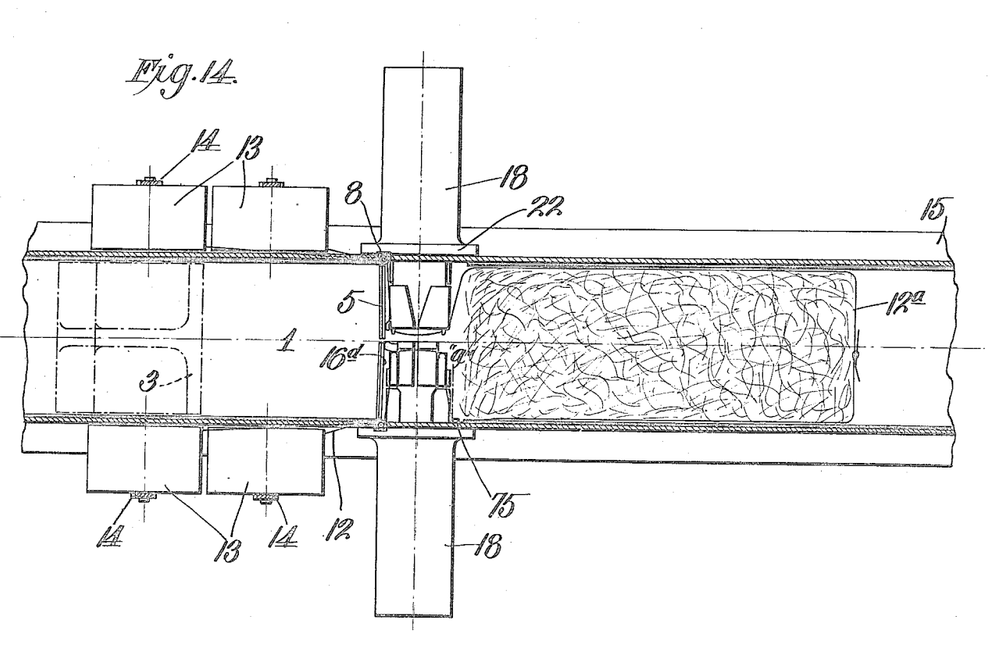
Fig. 14, is a diagrammatic plan view showing the position of the wires and certain parts preliminary to the operation of the mechanism for completing the encircling of the bale by the wires and the cutting and tying of the latter.
Figure 17:
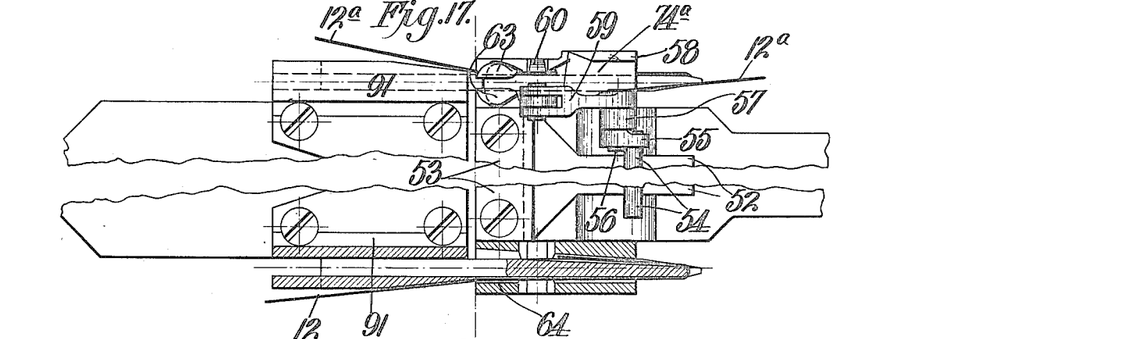
Fig. 17, is a view showing the needles with the second wire threaded through the said loops and bent or doubled back to form hooks; certain of the parts being shown partly in plan and partly in horizontal section in the plane of the upper needle.

Referring now to the needle mechanism, 91 are needle guides, secured to the inner ends of the central rack bar 33, and secured in any suitable manner to the flanking rack bars 30 are needles 92 slidingly engaging the guides 91 and normally projecting slightly beyond the inner ends thereof, as shown, and engaging the wires at the left hand side of the press between the guides 9 and guides 5ª at such side, as shown clearly in Fig. 13. In the inward movement of the rack bars of the needle box, the adjacent door 5 is swung inward as indicated by dotted lines, Fig. 9, as hereinbefore explained, and the needles advancing with the flanking rack bars and the central rack bar, force the wires between guides 9 and 5ª across the baling chamber and attain substantially the relative position shown by Fig. 15, as the central rack bar at the opposite side of the press reaches the center line of the press, as indicated by the dotted line in Fig. 15. As the horns move inward until their inner ends are flush with the inner end of the central rack bar and hence with the central line of the press, as indicated in Fig. 16, the rack bars of the needle mechanism box have attained the position shown in Fig. 16, at which time, it will be noted that the ends of the needles have entered the channels 64 of the horns, and the wires between the needles are bearing against the cutting edges 90 of the blades 88, it being likewise noticed by reference to the same figure, that the said wires are pressed by said cutting edges 90 into grooved lugs 93 projecting from certain of the guides 91, as shown most clearly in Figs. 13, 15 and 16. As the wires are thus severed by the cutting edges 90 of the blades, the inward movement of the central rack bar of the needle mechanism box ends. The flanking rack bars 30 however, continue their inward movement and thus slide the needles through the channels 64 of the horns across the pockets 61 and the off-set ends of the pivoted forks 60 and then through the channels 65, as indicated by Fig. 17, it being noticed by reference to said figure, that as the needles advance through the channels, the portions of the wires between the needles were doubled back along the sides thereof, the last-named figure being shown partly in section to more clearly disclose the construction last referred to.

Figure 18:
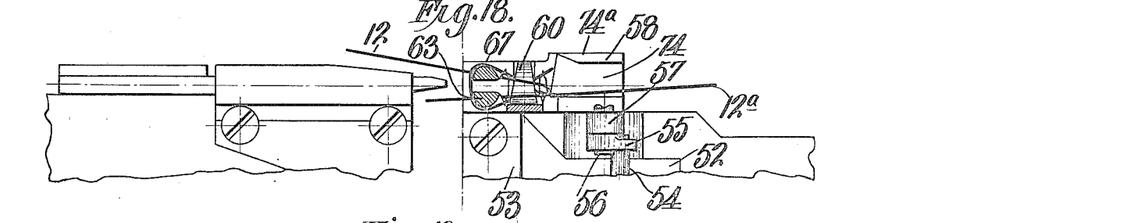
Fig. 18, is a view showing the wires knotted together before the knot is drawn tight by the bale, as hereinafter explained, the needles being shown as withdrawn from engagement with the wires.
Figure 19:
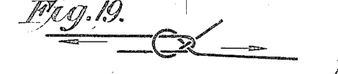
Fig. 19, is a detailed view of the knotted ends of the wires before the knot is entirely completed.

Immediately after the operation last described, the needles begin their reverse or outward movement and in withdrawing do not pull the double wires back through the channels 65 because the tendency of the double ends of the wires to spring apart causes them to press against the sides of the channels 65 with sufficient force to prevent any frictional contact between them and the needles, from drawing them back with the latter. When the pin 43 attains the outer end of slot 42ª the central rack bar begins to move outward also, and when the rack bars and the needles have attained the position shown by Fig. 18, loose knots are formed by the expansion of the baling material. It will be obvious by reference to Fig. 18 when the needles are withdrawn the bale is free to and does impose a pulling strain on the needle-bent ends of the wires and therefore by the time the needle is withdrawn to the position shown in Fig. 18, the said needle-bent ends are drawn back out of the channels 65, and in thus drawing back, their bent back ends pass under the cross looped ends of the wires leading from the bale, over said wires at the opposite side of the crossing point and draw the loops of said wires formed by the horns 63, as shown in Fig. 18, it being noticed that during the insertion and withdrawing of the needles in and from the channels 64 and 65, the rack bars of the looping and cutting mechanism box have remained stationary. Immediately after the actions described have occurred, the outer rack bars of the looping and cutting mechanism box move outward, and in so doing draw the corresponding ends of the wires outward and as said outward movement begins, the pins 54 in the outer or off-set ends of the slots of the angle arms 55, impart quick movement thereto for the purpose of withdrawing the forked arms 60 from the pockets 61 to permit the spring-repressed pins 71 to be projected into said pockets and insure the disengagement of the bent looped ends of the wires from the horns, and immediately this occurs, the bale is free to expand to its fullest extent and thereby exert a powerful pull on the wires in the direction indicated by the arrows, Fig. 19, and thereby complete the formation of the knots, Fig. 19, showing a knot almost completed.

Referring now to the mechanism for imparting inward and outward movement to the looping and cutting and needle mechanisms, 94 are guides depending from opposite sides of the baling case, and extending through said guides are the links 28, the inner ends of said links being pivotally connected to tubular guides 95 slidingly receiving cam bars 96 and 97, the former being disposed nearer the vertical plane of the longitudinal center of the press than bar 97, and having a shorter cam or inclined portion than the latter, so that when the cam bars are reciprocated longitudinally, the movement imparted by the cam bar 96 to the connected oscillatory segment 27, shall be shorter than the movement imparted by the cam bar 97 to the other oscillatory segment 27, for a purpose which hereinafter appears.

The cam bars 96 and 97 extend through guides 98 depending from the bottom of the baling case, and to coöperate with the guides 98 they are connected by a cross bar 99 carrying a longitudinally extending bar 100 extending through a guide 101 depending from the baling case, and the front end of the cam bars and bar 100 are pivotally connected by links 102 to a pull bar 103 provided with a depending tooth 104, and terminating at its front end in a down-turned hook 105, adapted for engagement under certain conditions by a cross pin 106, carried by depending ears 107 of the head block or plunger 3, the bottom of the baling case having a longitudinal slot 108 to accommodate said ears.

Assuming that wires lead from the spools at opposite sides of the baling case into the latter as hereinbefore explained, and that sufficient material has been compressed in said chamber and against the knotted ends of said wires to form a bale of the required size, the bar 103 is permitted to drop downward until its hook end occupies the plane of the pin 106. Means for performing this function automatically will form the subject matter of a separate application, as the dropping of said bar as described may be controlled manually. Upon the ensuing power stroke of the head block or plunger the pin 106 pushes said bar upward out of the way and then upon the withdrawal stroke of the plunger said pin engages the hook 105 and imparts forward movement to the cam bars. As the cam bars start forward they impart oscillatory inward movement to the two sets of rack bars, the looping and cutting mechanism rack bars moving inward more rapidly than the needle mechanism box rack bars. The looping and cutting mechanism rack bars move inward to the center of the press but they do not travel quite as far as the other rack bars because the latter in their initial positions are disposed a slightly greater distance from the longitudinal center of the press, as will be seen by reference to Figs. 3 and 13, and it will also be apparent by reference to Fig. 2, that after the inward movement of the needle mechanism box rack bar 30 ends, by reason of the segment passing out of gear with the teeth of said bar, the inward movement of the needles continues for the purpose of performing the functions described in connection with the mechanism illustrated more especially by Figs. 13, 15, 16, 17 and 18.

During the looping, cutting and knotting operations described, the doors stand open as indicated more particularly in Figs. 5, 9 and 14—the latter in dotted lines—and therefore prevent hay passing from the hopper into the baling chamber from interfering with the above mentioned operations, the provisions of the doors therefore avoiding any cessation in the feeding operation and consequent loss of a stroke by the head block or plunger, as upon the ensuing power stroke of the latter the bar 103 is forced rearwardly and through the cam bars, and the other connections described effects the withdrawal of the rack bars and parts carried thereby, which withdrawal permits the springs 29 to instantly reclose the doors so that the baling material may have an unobstructed path, it being of course understood that the first charge of baling material is forced by the head block or plunger against the tied wires nearest the hopper and that the additional charges of material supplied for the formation of the next bale cause the spools to pay out the necessary amount of wire.

When the next bale is of the proper size, the operation of the cam bars is again effected and the operations hereinbefore described are repeated. In view of the fact that the operations of the different parts have been described in connection with the detailed description of parts, it is believed that a recapitulation of the entire operation is unnecessary. While we have described and shown what is at this time deemed the preferred construction of the invention, it is to be understood that we reserve the right to make all changes which properly fall within the principle of construction involved.

Claims:

1. In a baling press, a baling case having opposite side openings, and wire guides at the forward side and wire-receiving openings at the rear side of the said side openings, and doors controlling said side openings.

2. In a baling press, a baling case having opposite side openings, wire guides at the forward side and wire-receiving openings at the rear side of the said side openings, doors controlling said side openings, and yielding means for closing the said doors.

3. In a baling press, a baling case having opposite side openings, wire guides at the forward side and wire-receiving openings at the rear side of the said side openings, doors controlling said side openings, and yielding means for closing the said doors; said doors being hinged adjacent said wire guides, the free edges of the doors normally forming the front ends of the said wire-receiving openings.

4. In a baling press, a baling case having opposite side openings and wire guides, wire-carrying holders from which wires extend along the outer sides of the baling case and through said guides and into the case through said openings; the ends of said wires being knotted together within the case, means to compress baling material within the case against said knotted ends of the wires, means to press the wires inward between the said wire guides and the compressed baling material, and means to bend one of the wires at opposite sides of the center of its inwardly-pressed portion.

5. In a baling press, a baling case having opposite side openings and wire guides, wire-carrying holders from which wires extend along the outer sides of the baling case and through said guides and into the case through said openings; the ends of said wires being knotted together within the case, means to compress baling material within the case against said knotted ends of the wires, means to press the wires inward between the said wire guides and the compressed baling material, means to bend one of the wires at opposite sides of the center of its inwardly-pressed portion, and means to sever said wire between the points where it is bent.

6. In a baling press, a baling case having opposite side openings and wire guides, wire-carrying holders from which wires extend along the outer sides of the baling case and through said guides and into the case through said openings; the ends of said wires being knotted together within the case, means to compress baling material within the case against said knotted ends of the wires, means to press the wires inward between the said wire guides and the compressed baling material, relatively-movable means to bend one of the said wires at opposite sides of the center of its inwardly bent portion, and relatively-movable blades for cutting said wire at said central point to permit the free ends thus produced to double back and form loops at the severed ends of the wire under the pressure of said wire-bending means.

7. In a baling press, a baling case having opposite side openings and wire guides, wire-carrying holders from which wires extend along the outer sides of the baling case and through said guides and into the case through said openings; the ends of said wires being knotted together within the case, means to compress baling material within the case against said knotted ends of the wires, means to press the wires inward between the said wire guides and the compressed baling material, relatively-movable means to bend one of the said wires at opposite sides of the center of its inwardly bent portion, means for cutting said wire at said central point to permit the free ends thus produced to be bent back to form loops at the severed ends of the wire, and means for bending the loops at intermediate points to dispose the looped portions thereof obliquely so that horizontally movable objects may be thrust through them.

8. In a baling press, a baling case having opposite side openings and wire guides, wire-carrying holders from which wires extend along the outer sides of the baling case and through said guides and into the case through said openings; the ends of said wires being knotted together within the case, means to compress baling material within the case against said knotted ends of the wires, means to press the wires inward between the said wire guides and the compressed baling material, relatively-movable means to bend one of the said wires at opposite sides of the center of its inwardly bent portion, means for cutting said wire at said central point to permit the free ends thus produced to be bent back to form loops at the severed ends of the wire, means for bending the loops at intermediate points to dispose the looped portions thereof obliquely so that horizontally movable objects may be thrust through them, and means for severing the other wire about centrally of the inwardly pressed portion thereof.

9. In a baling press, a baling case having opposite side openings and wire guides, wire-carrying holders from which wires extend along the outer sides of the baling case and through said guides and into the case through said openings; the ends of said wires being knotted together within the case, means to compress baling material within the case against said knotted ends of the wires, means to press the wires inward between the said wire guides and the compressed baling material, relatively-movable means to bend one of the said wires at opposite sides of the center of its inwardly bent portion, means for cutting said wire at said central point to permit the free ends thus produced to be bent back to form loops at the severed ends of the wire, means for bending the loops at intermediate points to dispose the looped portions thereof obliquely so that horizontally movable objects may be thrust through them, and relatively movable means for severing the other wire about centrally of the inwardly pressed portion thereof.

10. In a baling press, a baling case having opposite side openings and wire guides, wire-carrying holders from which wires extend along the outer sides of the baling case and through said guides and into the case through said openings; the ends of said wires being knotted together within the case, means to compress baling material within the case against said knotted ends of the wires, a pair of needles for engaging one of the said wires between its said wire guide and wire-receiving opening and pressing it transversely inward into the baling case, and means to sever the wire between the needles without interrupting the inward movement of the latter.

11. In a baling press, a baling case having opposite side openings and wire guides, wire-carrying holders from which wires extend along the outer sides of the baling case and through said guides and into the case through said openings; the ends of said wires being knotted together within the case, means to press one of the wires transversely inward from its side of the case, means to sever the inwardly pressed portion of the said wire, means to form loops at the free ends thus produced, a pair of needles for pressing the other wire inward at points transversely alined with said loops, and means to sever the last-named wire between the needles without interrupting the inward travel of the latter to and through the said loops of the other wire.

12. In a baling press, a baling case having opposite side openings and wire guides, wire-carrying holders from which wires extend along the outer sides of the baling case and through said guides and into the case through said openings; the ends of said wires being knotted together within the case, means to press one of the wires transversely inward from its side of the case, means to sever the inwardly pressed portion of the said wire, means to form loops at the free ends thus produced, a pair of needles for pressing the other wire inward at points transversely alined with said loops, means to sever the last-named wire between the needles without interrupting the inward travel of the latter to and through the said loops of the other wire, means for holding the looped ends of the first-named wire immovable until the continued travel of the needles has threaded the free ends of the needle carrying the wire through and beyond the loops and free to spring laterally away from the adjacent portions of said wire, and means to set free the looped ends of the wires.

13. In a baling press, a baling case having opposite side openings and wire guides, wire-carrying holders from which wires extend along the outer sides of the baling case and through said guides and into the case through said openings; the ends of said wires being knotted together within the case, means to press one of the wires transversely inward from its side of the case, means to sever the inwardly pressed portion of the said wire, means to form loops at the free ends thus produced, a pair of needles for pressing the other wire inward at points transversely alined with said loops, means to sever the last-named wire between the needles without interrupting the inward travel of the latter to and through the said loops of the other wire, means for holding the looped ends of the first-named wire immovable until the continued travel of the needles has threaded the free ends of the needle carried wire through and beyond the loops and free to spring laterally away from the adjacent portions of said wire, means to set free the looped ends of the wires to permit the bale to expand and draw the ends of the wires around the same into a tight knot, and means to apply pressure on the other newly knotted ends of the wires to draw them into a tight knot against which the next bale to be produced will be compressed.

14. In a baling press, a baling case having opposite side openings and wire guides, wire-carrying holders from which wires extend along the outer sides of the baling case and through said guides and into the case through said openings; the ends of said wires being knotted together within the case, means to press one of the wires transversely inward from its side of the case, means to sever the inwardly pressed portion of the said wire, means to form loops at the free ends thus produced, a pair of needles for pressing the other wire inward at points transversely alined with said loops, means to sever the last-named wire between the needles without interrupting the inward travel of the latter to and through the said loops of the other wire, means for holding the looped ends of the first-named wire immovable until the continued travel of the needles has threaded the free ends of the needle carried wire through and beyond the loops and free to spring laterally away from the adjacent portions of said wire, means to set free the looped ends of the wires to permit the bale to expand and draw the ends of the wires around the same into a tight knot, doors normally forming parts of the side walls of the baling case and forced to open inwardly by the means for pressing the wires laterally into the case, and yielding means for reclosing the doors after the knots are formed, to cause the doors to incidentally press rearwardly and outwardly on the newly knotted ends of the wires not encircling the bale to tighten the knot uniting said wires.

15. In a baling press, a baling case having side openings, doors controlling the same, wire guides forward of the doors, wire-receiving openings rearward of the doors with their front ends formed by the latter, and a guide arranged adjacent the free edge of one of the doors, said guide having a yieldingly advanced pin adapted for automatic repression under pressure applied laterally thereon by a wire extending through the guide at the corresponding side of the press and from a partly formed bale within the baling case rearward of the door.

16. In a baling press, a baling case having side openings, doors controlling the same, wire guides forward of the doors, wire-receiving openings rearward of the doors with their front ends formed by the latter, a guide arranged adjacent the free edge of one of the doors, said guide having a yieldingly advanced pin adapted for automatic repression under pressure applied laterally thereon by a wire extending through the guide at the corresponding side of the press and from a partly formed bale within the baling case rearward of the door, and means for repressing the yieldingly advanced pin to free the wire extending through the guide adjacent the free edge of the door.

17. In a baling press, a baling case having side openings, doors controlling the same, wire guides forward of the doors, wire-receiving openings rearward of the doors with their front ends formed by the latter, a guide arranged adjacent the free edge of one of the doors, said guide having a yieldingly advanced pin adapted for automatic repression under pressure applied laterally thereon by a wire extending through the guide at the corresponding side of the press and from a partly formed bale within the baling case rearward of the door, a lever pivoted to said yieldingly advanced pin, and a cam for operating said lever to effect the repression of said pin and the freeing of the wire engaged thereby.

18. In a baling press, a baling case having side openings, doors controlling the same, wire guides forward of the doors, wire-receiving openings rearward of the doors with their front ends formed by the latter, and a guide arranged adjacent the free edge of one of the doors, said guide comprising a vertical inturned hook, a pocket opposite and spaced from the hook terminal, and a spring actuated pin fitting in the pocket and held yieldingly against the terminal of the hook, that portion of the pin between the pocket and hook being in the form of an outwardly facing beveled hook, the beveled portion extending from the open end of the pocket to the terminal of the first-named hook so that a wire applying pressure sidewise against said beveled surface shall repress said pin and enter the guide and engage the hook end of said pin.

19. In a baling press, a baling case having side openings, doors controlling the same, wire guides forward of the doors, wire-receiving openings rearward of the doors with their front ends formed by the latter, and a guide arranged adjacent the free edge of one of the doors, said guide comprising a vertical inturned hook, a pocket opposite and spaced from the hook terminal, and a spring actuated pin fitting in the pocket and held yieldingly against the terminal of the hook, that portion of the pin between the pocket and hook being in the form of an outwardly facing beveled hook, the beveled portion extending from the open end of the pocket to the terminal of the first-named hook so that a wire applying pressure sidewise against said beveled surface shall repress said pin and enter the guide and engage the hook end of said pin, and means to repress said pin within the pocket to cause the open end of the latter to strip the wire from engagement with the hook end of the pin to permit said wire to withdraw laterally from the guide.

20. In a baling press, a block bifurcated to form a pocket and provided with alined channels in the arms produced by the bifurcation, one of said arms being bifurcated at right angles to the pocket to provide for ingress to and egress from the channel of said arm and to form a pair of horns; the other arm being provided with a longitudinal channel alined with the bifurcation between said horns.

21. In a baling press, a block bifurcated to form a pocket and provided with alined channels in the arms produced by the bifurcation, one of said arms being bifurcated at right angles to the pocket to provide for ingress to and egress from the channel of said arm and to form a pair of horns; the other arm being provided with a longitudinal channel alined with the bifurcation between said horns, a pin fitting slidingly in the block, and a spring tending to project said pin into the pocket from the bottom thereof.

22. In a baling press, a baling case having opposite side openings and openings communicating with the said side openings at the rear margins thereof, wire guides forward of the first-named openings, doors controlling the said side openings, open wire guides carried by and at the outer sides of the doors near the free edges thereof, a wire guide at one side of the case rearward of the adjacent door guide, a pair of transversely arranged reciprocatory bars opposite and outward of each door opening, an intermediate reciprocatory bar between each pair of bars, means whereby the bars are caused to move inward and the intermediate bars to force the doors inward to transversely-alined positions to form a partition for the case, one of the intermediate bars having outwardly-facing hooks at its inner end, upwardly projecting inwardly-facing horns carried by the said adjacent bars at one side of the press, and a pair of needles movable with the adjacent bars of the intermediate bar at the opposite side of the press.

23. In a baling press, a baling case having opposite side openings and openings at the rear edges of and communicating with the side openings, wire guides forward of the side openings and doors controlling said side openings, wire guides carried by the doors near their free edges to receive a pair of said baling wires which lead through the first-named guides and through the openings communicating with the said side openings and around the rear end of the bale and along the sides thereof, a pair of transversely arranged reciprocatory bars outward of each door controlled opening, an intermediate reciprocatory bar between the bars of each pair of bars, one of said intermediate bars having outwardly facing hooks at its inner end, means whereby the bars are caused to move inward and the intermediate bars to force the doors inward to transversely alined positions to form a partition for the baling case; one pair of said pairs of bars having inwardly facing horns to engage and force the wire at the corresponding side inwardly between the guides through which it extends and against the outturned hooks of said intermediate bar, a pair of needles movable with the pair of bars at the opposite side of the case and adapted to engage the other wire at points in line with said horns and bend it inwardly into the case between the guides through which it extends and the bale, means for severing the wire engaging the horns at a point between the same after the inward movement of the adjacent intermediate bar has ceased but before such movement of the corresponding pair of bars is terminated so that the continued movement of the horns shall bend the ends of the severed wire around said horns to form loops, means to bend said loops outwardly of the horns, and means for severing the wire engaged by the needles at a point between the same to permit the needles to thread the ends thus produced through the loops on the alined horns and withdraw from said horns before the means which bent said loops releases the same.

24. In a baling press, a baling case having opposite side openings and openings communicating with said side openings at the rear margins thereof, wire guides forward of the first-named openings, doors controlling the said openings, open wire guides carried by and at the outer sides of the doors near the free edges thereof, a wire guide at one side of the case rearward of the adjacent door guide, a pair of transversely arranged reciprocatory bars opposite and outward of each door opening, an intermediate reciprocatory bar between each pair of bars, means whereby the bars are caused to move inward and the intermediate bars to force the doors inward to transversely-alined positions to form a partition for the case, one of the intermediate bars having outwardly-facing hooks at its inner end, upwardly projecting inwardly-facing horns carried by the said adjacent bars at one side of the press, a pair of needles movable with the adjacent bars of the intermediate bar at the opposite side of the press, wire-severing means for action at a point between the horns after the inward movement of the intermediate bar has ceased but before the inward movement of the adjacent bars has terminated, so that the continued movement of the horns shall bend the ends of wire severed by said severing means, around the said horns to form loops, means to bend said loops vertically at points outward of the horns, means for severing wire engaged by the needles at a point between the latter, to permit the needles to thread the ends thus produced, through the said loops on the alined horns, means to free the wire from the guide located at one side of the press only, after the needles have threaded the ends of the wires through said loops, and means to effect the disengagement of the loosely knotted wires from said horns.

25. In a baling press, a baling case having opposite side openings, doors controlling said openings, means for moving said doors to transversely-alined positions within the case to constitute a partition therefor, and means to bow wires into the case from opposite sides thereof through the said side openings.

26. In a baling press, a baling case having opposite side openings, doors controlling said openings, means for moving said doors to transversely-alined positions within the case to constitute a partition therefor, means to bow wires into the case from opposite sides thereof through the said side openings, and means to sever said wires.

27. In a baling press, a baling case having opposite side openings, doors controlling said openings, means for moving said doors to transversely-alined positions within the case to constitute a partition therefor, means to bow wires into the case from opposite sides thereof through the said side openings, means to sever said wires, and means to knot together the adjacent ends of opposite wires at both sides of the point where the wires were severed.

28. In a baling press, a baling case having opposite side openings, doors controlling said openings, means for moving said doors to transversely-alined positions within the case to constitute a partition therefor, means to bow wires into the case from opposite sides thereof through said side openings, means to sever said wires, means to knot together the adjacent ends of opposite wires at both sides of the points where the wires were severed, and means for reclosing said doors when permitted by the means which opened them and the means which bowed the wires inward.

29. In a baling press, a baling case having opposite side openings and openings communicating with said side openings at the rear margins thereof, wire guides forward of said side openings, doors controlling said side openings, open wire guides carried by and at the outer sides of the doors near the free edges thereof, a wire guide at one side of the case rearward of the adjacent door guide, a pair of transversely-arranged bars opposite and outward of each door opening, an intermediate bar between each pair of bars, and means whereby said bars are moved inward to cause said pairs of bars to bow wires engaging said guides, into the case, and the intermediate bars to move said doors to transversely-alined positions within said case to constitute a partition therefor.

In testimony whereof, we affix our signatures, in the presence of two witnesses.
FOKKO H. G. BRANDT.
JOHN R. EVANS.

Witnesses:
H. C. RODGERS,
G. Y. THORPE.